United States Patent [19]

Westphal

[11] Patent Number: 4,878,757

[45] Date of Patent: Nov. 7, 1989

[54] TUBE FOR A MICROSCOPE

[75] Inventor: Klaus Westphal, Oberkochen, Fed. Rep. of Germany

[73] Assignee: Carl-Zeiss-Stiftung, Heidenheim/Brenz, Fed. Rep. of Germany

[21] Appl. No.: 242,329

[22] Filed: Sep. 8, 1988

[30] Foreign Application Priority Data

Sep. 11, 1987 [DE] Fed. Rep. of Germany ... 8712342[U]

[51] Int. Cl.$^4$ ..................... G02B 21/18; G01N 21/59
[52] U.S. Cl. .................................. 356/432; 356/219; 356/225
[58] Field of Search ............... 356/432, 218, 219, 225; 250/237 R

[56] References Cited

U.S. PATENT DOCUMENTS 4,790,663  12/1988  Faltermeier et al. ............... 356/432

Primary Examiner—Vincent P. McGraw
Attorney, Agent, or Firm—Stonebraker, Shepard & Stephens

[57] ABSTRACT

A microscope tube contains prisms mounted on a prism carriage switchable between a position for visual observation of a specimen and a position for photometry or photography of the specimen. A diaphragm (6) mounted on and movable with the carriage has a blocking position impeding entrance of light through the eyepiece window of the tube, and an ineffective or non-blocking position which does not impede entrance of such light. A manually operable handle in the form of a knob (9) mounted externally of the tube controls mechanical linkage parts (8, 10, 11) for shifting the diaphragm from its blocking position to its non-blocking position when the carriage is in the photometry or photography position, in case the user may wish to make a visual inspection of the specimen at that time. If the diaphragm has been moved to its non-blocking position, it returns automatically to its blocking position whenever the prism carriage is switched back from photometry or photography position to visual observation position, thus assuring that the diaphragm will not be accidentally in non-blocking position when the carriage is next shifted to the photometry or photography mode.

11 Claims, 4 Drawing Sheets

TUBE FOR A MICROSCOPE

BACKGROUND OF THE INVENTION

This invention relates to a tube for a microscope having means for switching between different modes of operation, and having a diaphragm which covers the eyepiece viewer in the "photometry" or "photography" switch position. Such a tube is known, for instance, from Swiss Pat. No. 615,762 (Haas), issued 15 Feb. 1980, and from German Federal Republic patent application No. 3636616.1 The disclosures of those patents will serve as background for the present invention.

The diaphragm which is provided in the case of known photometer tubes has the object of preventing disturbing external light, which falsifies the photometric measurements, from entering the tube through the eyepiece viewer. Since the eyepiece viewer must be freed for entrance of light when a photometric visual observation of the object is to be made, the blocking diaphragm may be swung into and out of blocking position either manually by means of a suitable handle, or automatically by magnets when switching from one mode to the other, as described for example in the above mentioned patents.

Automatic switching by electromagnets or motors is disadvantageous in many cases, for instance when there is no room for such drives in the tube, or when the expense of electric drives is to be avoided.

The object of the present invention is to provide a tube of the above mentioned kind which has the simplest possible mechanical coupling between the external-light diaphragm and the switching means for switching or changing from one to another of the different modes of operation of the microscope.

SUMMARY OF THE INVENTION

This object is achieved by providing a diaphragm which is coupled for movement with a prism carriage which moves upon switching from one mode of operation to another mode, and providing an actuating handle on the outside of the tube, the handle serving to actuate the diaphragm.

In this way, there is obtained a particularly simple automatic coupling of the movement of the diaphragm to the switching process between the different switch positions. Furthermore, this coupling can be intentionally overcome or rendered ineffective if so desired by the user, for instance in order to view visually the object which is to be examined while at the same time the carriage and prisms are in the position or mode for photometry or photography.

Further advantages will be noted as the description proceeds.

DESCRIPTION OF THE PREFERRED EMBODIMENT

Figure 1:
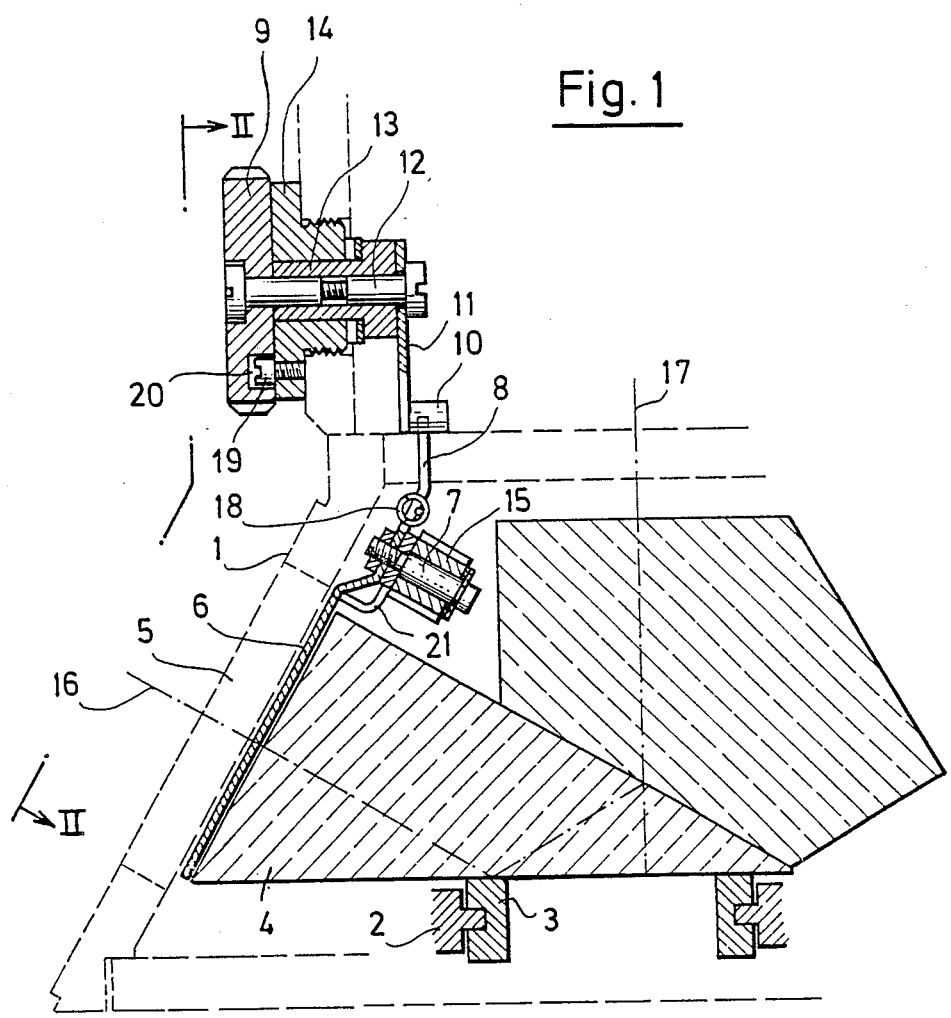
FIG. 1 is a schematic sectional view of the essential parts of a photometer tube in accordance with a preferred embodiment of the invention, taken on a sectional plane containing the optical axis.

In the drawings, only those parts of the photometer tube which are necessary for understanding the construction and function of the diaphragm automatic operating mechanism have been shown. Other parts not here illustrated will be understood by those skilled in the art. A complete description of the optical system of the tube is contained in applicant's German patent application No. 3636616.1 of October 28, 1986, and applicants U.S. patent application Ser. No. 109956 of Oct 19, 1987, now U.S. Pat. No. 4,790,663, with the difference that the electromagnetic drive described in that patent application for actuating the diaphragm is now replaced by the mechanical drive or mechanism of the present invention.

The housing of the photometer tube is partially shown at 1. Mounted within this housing are guide rails 2, on which a carriage 3 slides. Prisms 4 and 24 are mounted on this carriage and move therewith. The carriage and prisms move back and forth between the position shown in FIG. 2 (which is the position for visual observation of the specimen being examined) and the position shown in FIGS. 3 and 4 (which is the position for photometry or photography of the specimen). The optical axis of the ray path which passes through the prism is indicated at 16. When the carriage and prisms are in the left-hand position (FIG. 2) this optical axis passes through the observation prism 24. When they are in the right-hand position (FIGS. 3 and 4) this optical axis passes through the photometry or photography prism 4.

Mounted on the carriage 3 by means of a bracket or holder 15 is a swivel shaft 7 located centrally above the prism 4. Rotatably mounted on this shaft 7 is a diaphragm lever 8 of a diaphragm 6 which, in the effective or blocking position shown in FIGS. 1-3, covers the prism 4. A tension spring 18, stretched between the diaphragm lever and the prism carriage, pulls the lever into its operating or blocking position, against a stop or abutment 21 carried by the bracket 15.

The prisms 4 and 24 are divider prisms, with approximately reciprocal divider characteristics. The prism allows the greater part of the light (about 80% to 90% of the light) coming from the microscope objective to pass along the axis 17 toward a receiver (not shown) which may be a camera or a photometer device or photomultiplier, and diverts or switches the smaller part of the light (about 10% to 20%) along the axis 16 into the eyepiece window 5. On the other hand, when the prism 24 serving for visual observation is positioned in the optical axis, it switches the greater part (about 80% to 90%) of the light coming from the microscope objective into the eyepiece window 5 of the eyepiece tube and passes a small amount of light (about 10% to 20%) to an illuminated measurement field diaphragm from which the light is reflected back and mirrored into the eyepiece tube.

Above the prism slide 3 there is fastened on the outside of the housing 1 of the photometer tube a handle 9 in the form of a rotary knob. The shaft 13 (FIG. 1) of this knob turns in an externally threaded bearing part 14 which is screwed firmly into a part of the housing 1. Fixed to the rear end of the shaft 13, as by a screw 12, is a lever 11 having a driver 10 for cooperation with the actuating lever 8 of the diaphragm 6. Upon actuation of the rotary knob 9, the driver 10 can move back and forth between two limit positions which are determined by a stop screw 19 engaging with one or the other end of an arcuate groove 20 in the knob 9.

Figure 2:
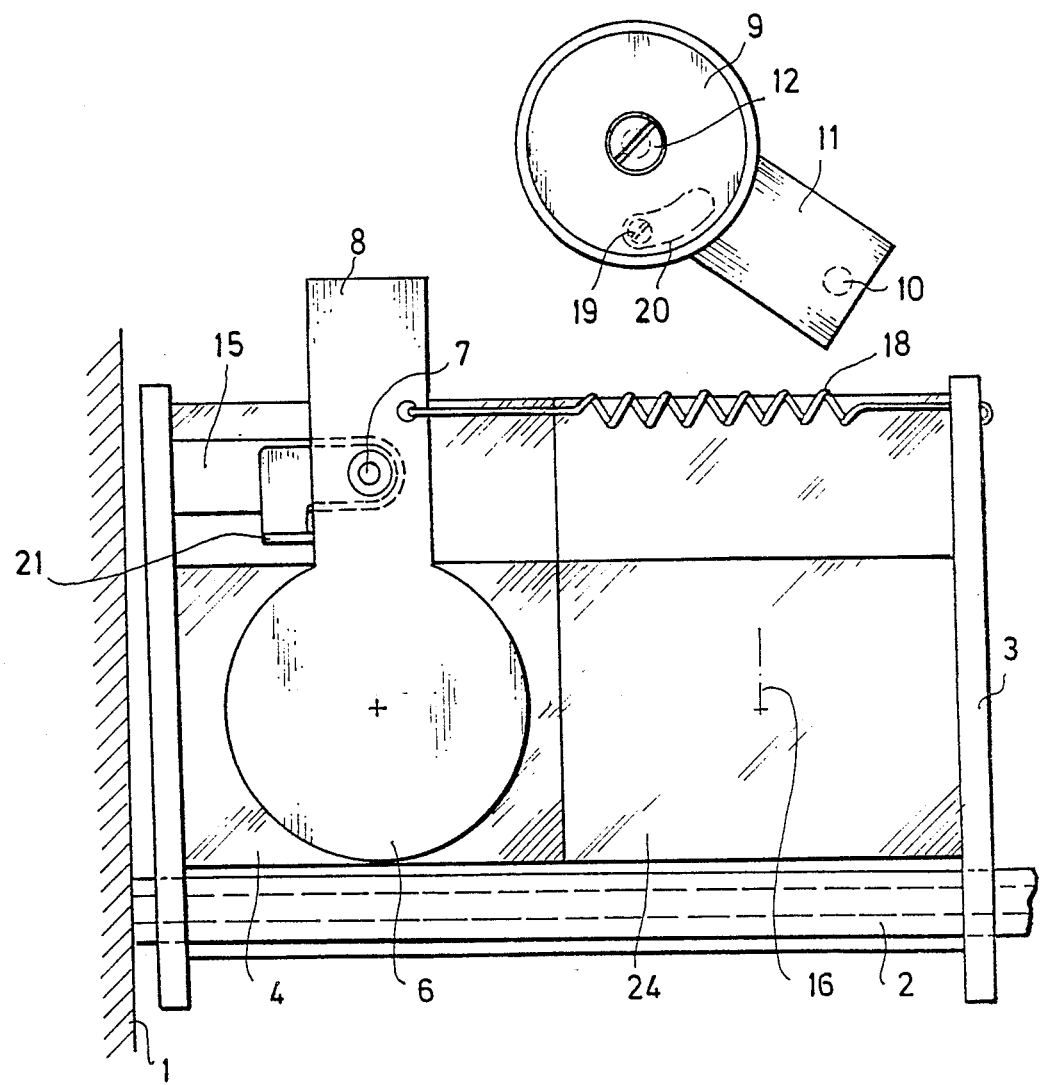
FIG. 2 is a view of the tube of FIG. 1, viewed from the position of the line II—II of FIG. 1, showing the parts in a first switched position.
Figure 3:
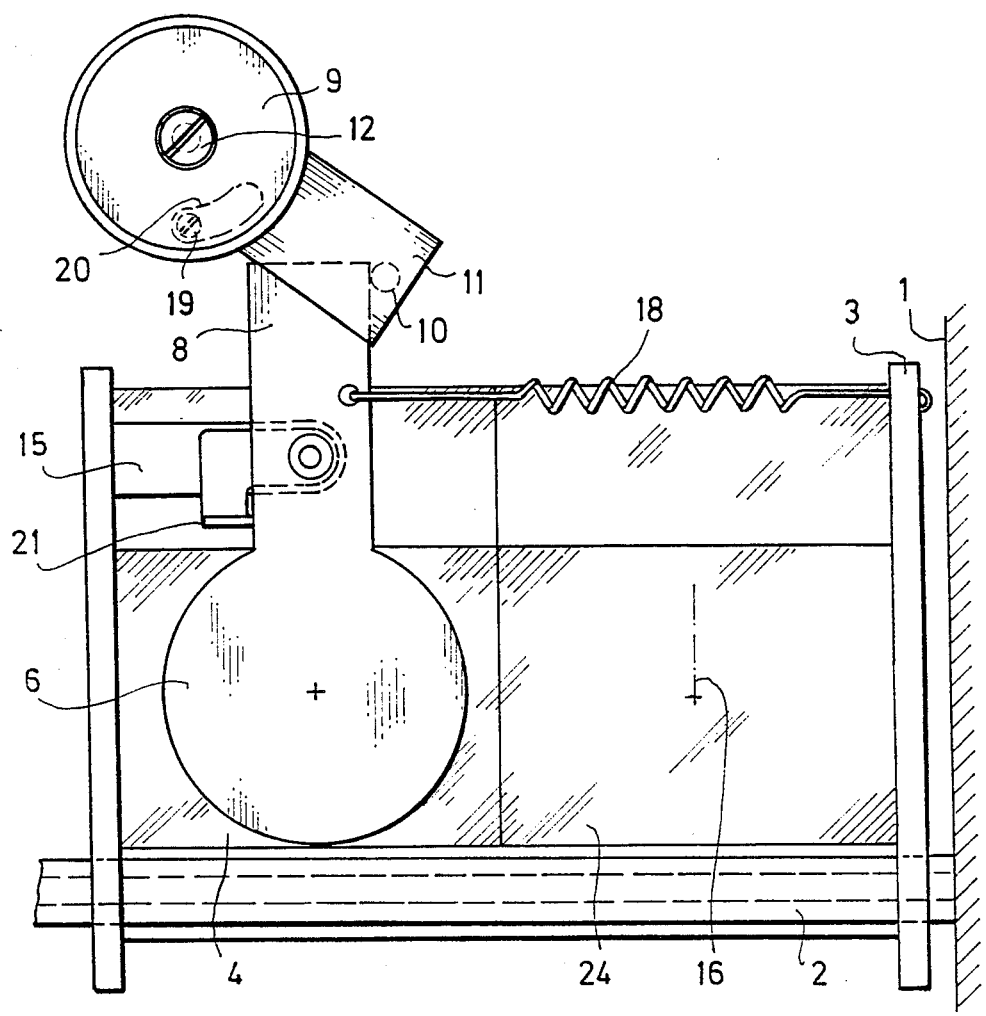
FIG. 3 is a view similar to FIG. 2, but with the parts in a second switched position.

If the prism carriage 3 moves rightward from the "visual observation" switch position shown in FIG. 2 into the "photometry" or "photography" switch position shown in FIG. 3, then the eyepiece window 5 is covered by the diaphragm 6 which is present in front of the prism 4. In this case the diaphragm lever 8 lies just against the driver 10 of the rotary knob 9. It is now possible to swing the diaphragm 6 away to a non-blocking or ineffective position by turning the knob 9 clockwise from the position of FIG. 3 to the position of FIG. 4, thereby swinging the lever 11 and driver 10 so that the driver engages the diaphragm operating lever 8 and moves it counterclockwise against the tension of the spring 18. In the limit position seen in FIG. 4, the force exerted by the spring 18 on the driver 10 is in the direction of a line from the driver 10 to the shaft 13, so that the arrangement is self-locking, there is no torque force tending to turn the knob 9, and the parts will stay in this position as long as the knob is not turned back or the prism carriage is not moved. In this position, with the diaphragm ineffective, the object to be photometered can be observed, for instance, with the photomultiplier connected.

Figure 4:
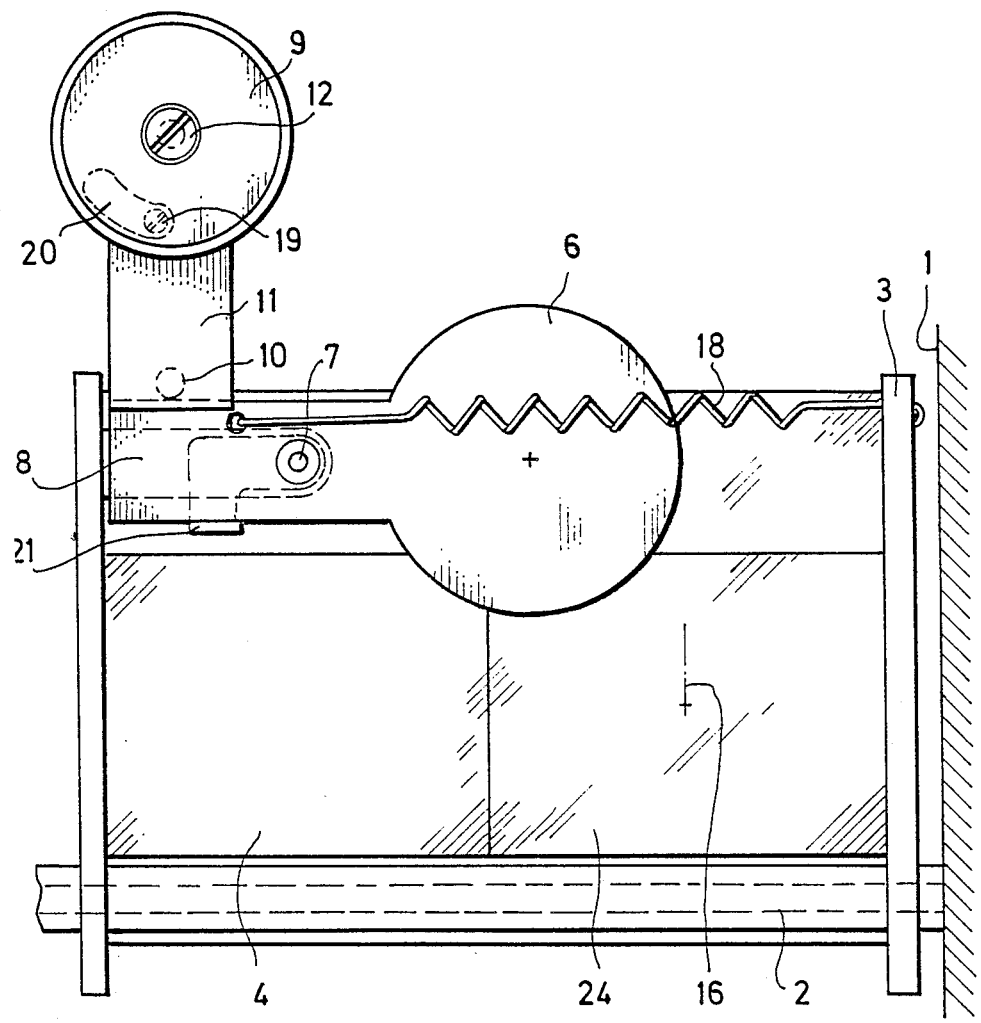
FIG. 4 is a similar view with the diaphragm moved to its ineffective position.

However, as soon as the prism carriage 3 is moved back from the switch position of FIG. 4 to the switch position of FIG. 2, the diaphragm 6 snaps back again and covers the prism 4. In this way, it is assured that the prism 4 is first closed after each renewed switching into the "photometry" switch position, thus avoiding any possibility of erroneous measurements as a result of external light due to an eyepiece viewer which has unintentionally remained open. In the "photometry" switch position an opening of the diaphragm 6 is possible only when the rotary knob 9 is purposely actuated.

It is evident from the foregoing description that the invention is applicable to a photometer tube, and also to a microscope tube with an attached camera, in which case the use of the invention will prevent the reduction in contrast of the photographic recording by incident external light. The invention can therefore be used in microscope tubes in general, whether adapted for photometry or for photography or for both.

What is claimed is:

1. A microscope tube comprising a prism carriage (3) movable within the tube between a first carriage position for visual observation of a specimen and a second carriage position for "photometry" or "photography" of said specimen, a diaphragm (6) coupled for movement with said prism carriage, said diaphragm being shiftable between a first diaphragm position blocking entrance of light from an eyepiece when said carriage is in its said second position and a second diaphragm position ineffective to block entrance of said light, a handle (9) mounted externally on said tube, and mechanical transmission means for actuating said diaphragm from said handle.

2. A microscope tube as defined in claim 1, wherein said diaphragm is turnably mounted on said carriage, and wherein said mechanical transmission means includes a diaphragm lever (8) for turning said diaphragm, and a displaceable driver (10) operatively connected to said handle and acting on said diaphragm lever to turn said diaphragm.

3. A microscope tube as defined in claim 2, further comprising a spring (18) acting on said diaphragm to tend to move said diaphragm to its said blocking position.

4. A microscope tube as defined in claim 3, wherein said blocking position of said diaphragm is determined by engagement of said diaphragm lever (8) with a stop (21).

5. A microscope tube as defined in claim 4, wherein said driver (10) is displaceable between at least two different positions, and in one of said positions said driver cooperates with said diaphragm lever (8) in such manner that said diaphragm is in non-blocking position relative to entrance of light from said eyepiece.

6. A microscope tube as defined in claim 5, wherein said mechanical transmission means is self-locking when said driver (10) is in said one of its said different positions, whereby said spring (18) will not move said diaphragm to its blocking position notwithstanding that no holding force is applied to said handle (9).

7. A microscope tube as defined in claim 6, wherein movement of said prism carriage (3) from its said second carriage position to its said first carriage position serves to disable said self-locking of said transmission means, so that said spring will then automatically shift said diaphragm to its blocking position.

8. A microscope tube as defined in claim 6, wherein said handle is a rotary knob (9) mounted on a shaft (13), and in the self-locking position of said transmission means said driver (10) and said shaft (13) lie on a line which extends substantially in the direction of the force exerted by said diaphragm lever (8) on said driver.

9. A microscope tube structure comprising means forming an eyepiece entrance window, prism means shiftable between a specimen viewing mode and a photometer/photography mode, diaphragm means shiftable between a light blocking position and a non-blocking position, spring means tending to maintain said diaphragm means in blocking position, an external manually operable handle, mechanical linkage means operatively connecting said handle to said diaphragm means to shift said diaphragm means from blocking position to non-blocking position upon actuation of said handle with sufficient force to overcome said spring means while said prism means is in photometer/photography mode, and means maintaining said diaphragm means in non-blocking position after release of force on said handle so long as said prism means remains in said photometer/photography mode, said diaphragm means being positioned in cooperative relation to said eyepiece entrance window when said prism means is in photometer/photography mode so that said diaphragm means may then block or admit light from said window, depending on the blocking or non-blocking position of said diaphragm means.

10. A microscope tube structure as defined in claim 9, further comprising means automatically disabling said maintaining means upon movement of said prism means from photometer/photography mode to viewing mode, so that said spring means may then restore said diaphragm means to blocking position.

11. A microscope tube structure as defined in claim 9, wherein said diaphragm means is mounted to move bodily with said prism means when said prism means is shifted between viewing mode and photometer/photography mode, and said diaphragm means is in cooperative relation to said eyepiece entrance window when said prism means is in photometer/photography mode and is offset from and in non-cooperative relation to said window when said prism means is in viewing mode.

* * * * *